(No Model.)

H. BUTTERS.
HOISTING PULLEY.

No. 349,691. Patented Sept. 28, 1886.

WITNESSES
E. A. Newman
C. M. Newman

INVENTOR
Horace Butters
By his Attorneys
Baldwin Hopkins & Peyton

N. PETERS, Photo-Lithographer, Washington, D. C.

UNITED STATES PATENT OFFICE.

HORACE BUTTERS, OF LUDINGTON, MICHIGAN.

HOISTING-PULLEY.

SPECIFICATION forming part of Letters Patent No. 349,691, dated September 28, 1886.

Application filed June 23, 1886. Serial No. 205,985. (No model.)

*To all whom it may concern:*

Be it known that I, HORACE BUTTERS, of Ludington, in the county of Mason and State of Michigan, have invented certain new and useful Improvements in Hoisting-Pulleys, of which the following is a specification, reference being had to the accompanying drawings.

My improvements relate to means for lubricating pulleys and pulley-blocks, the object being to provide a lubricant for the moving parts subject to strain that will be durable and not require frequent renewal, so that the pulleys will not be liable to get dry or rusty, or be unduly subject to wear.

Figure 3:
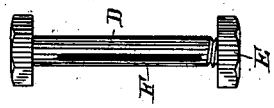
Figure 2:
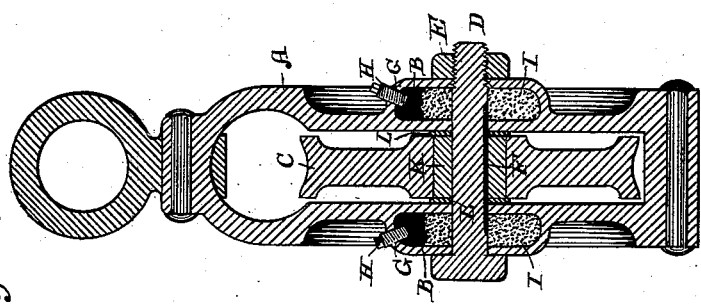
Figure 1:
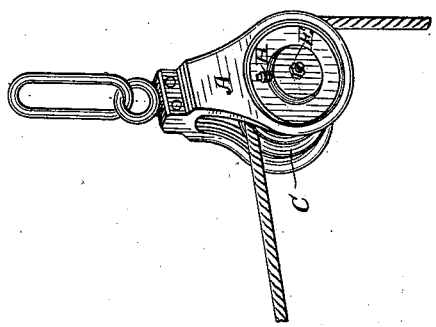

In the drawings, Figure 1 is a perspective view of one form of a single pulley-block provided with my lubricating device. Fig. 2 is a sectional view of another form of single pulley-block, also provided with my lubricating device. Fig. 3 is a view of the screw-bolt or pulley-shaft detached.

I provide, preferably as a part of the casting of the block A and integral therewith, an oil-reservoir, B, on either side of the block.

C indicates the pulley, and D the pulley-shaft passing through the block and pulley and the oil-reservoirs, and being held in place, preferably, by means of a nut, E. This fixed shaft contains a longitudinal oil-groove, F, extending into each reservoir. The reservoirs are each provided with oil-holes G, stopped by screw-stoppers H.

I indicates the ordinary cotton waste or filling used in lubricating journal-boxes. This is saturated with oil, and the reservoirs may be filled with the lubricant and closed or sealed by means of the screw-stoppers. The groove F in the pulley shaft or axle permits the oil to enter, and as the pulley revolves its bushing K is thoroughly lubricated, very little waste of the lubricant occurs, and the oil-boxes being once filled will automatically supply the lubricant to the pulley and its axle for a long period.

If desired, an annular anti-friction bushing may be applied to either side of the pulley between it and its block, as indicated at L, to prevent waste of the lubricant.

Having thus described my invention, what I claim to be new, and desire to secure by Letters Patent of the United States, is—

The combination, with a pulley-block, of oil-reservoirs B, having oil-openings G, and the pulley-shaft extending through the oil-reservoirs and block and pulley, and provided with a longitudinal oil-groove extending into the reservoirs, substantially as set forth.

In testimony whereof I have hereunto subscribed my name.

HORACE BUTTERS.

Witnesses:
  M. F. BUTTERS,
  GEO. OFFICER.